(12) United States Patent
Iwai et al.

(10) Patent No.: US 11,236,676 B2
(45) Date of Patent: Feb. 1, 2022

(54) HUMID AIR TURBINE

(71) Applicant: Mitsubishi Power, Ltd., Yokohama (JP)

(72) Inventors: Yasushi Iwai, Yokohama (JP); Hidefumi Araki, Yokohama (JP); Takuya Takeda, Yokohama (JP)

(73) Assignee: Mitsubishi, Power, Ltd., Yokohama (JP)

( * ) Notice: Subject to any disclaimer, the term of this patent is extended or adjusted under 35 U.S.C. 154(b) by 167 days.

(21) Appl. No.: 15/882,263

(22) Filed: Jan. 29, 2018

(65) Prior Publication Data
US 2018/0223737 A1 Aug. 9, 2018

(30) Foreign Application Priority Data
Feb. 6, 2017 (JP) .............................. JP2017-019348

(51) Int. Cl.
*F02C 7/26* (2006.01)
*F02C 9/28* (2006.01)
(Continued)

(52) U.S. Cl.
CPC .............. *F02C 7/26* (2013.01); *F01D 17/085* (2013.01); *F02C 3/04* (2013.01); *F02C 3/305* (2013.01);
(Continued)

(58) Field of Classification Search
CPC .... F02C 3/30; F02C 3/305; F02C 6/04; F02C 9/50; F02C 9/28; F02C 9/263; F02C 7/232; F05D 2270/16; F05D 2270/303
See application file for complete search history.

(56) References Cited

U.S. PATENT DOCUMENTS

2004/0112037 A1* 6/2004 Yagi .................... F01D 15/10
  60/39.3
2004/0255595 A1 12/2004 Morgan et al.
(Continued)

FOREIGN PATENT DOCUMENTS

JP 61-286537 A 12/1986
JP 2004-308596 A 11/2004
(Continued)

OTHER PUBLICATIONS

Extended European Search Report issued in counterpart European Application No. 18153783.8 dated Jul. 10, 2018 (seven (7) pages).
(Continued)

*Primary Examiner* — Gerald L Sung
*Assistant Examiner* — Jacek Lisowski
(74) *Attorney, Agent, or Firm* — Crowell & Moring LLP

(57) ABSTRACT

The invention aims to shorten the time required for start-up and prevent excessive increases in the heat loads on turbine blades. A humid air turbine includes a compressor; a combustor; a turbine; an exhaust heat recovery unit for recovering the heat of turbine exhaust gas to generate high-temperature moisture; a fuel supply system having a fuel flow rate control valve; an exhaust temperature acquiring unit for acquiring a temperature of the exhaust discharged while the turbine is driven; a combustion gas moisture ratio calculating section for calculating a ratio of moisture contained in combustion gas; an exhaust temperature upper limit calculating section for setting an exhaust temperature upper limit based on the combustion gas moisture ratio and the pressure ratio; an exhaust temperature difference calculating section for calculating the difference between the exhaust temperature upper limit and the exhaust temperature; a fuel flow rate command value calculating section for calculating a fuel flow rate command value using the
(Continued)

exhaust temperature difference; and a control command value output section for outputting a command signal to the fuel flow rate control valve based on the command value selected by a fuel flow rate command value selecting section.

12 Claims, 6 Drawing Sheets

(51) Int. Cl.

| | | |
|---|---|---|
| *F02C 3/30* | (2006.01) | |
| *F01D 17/08* | (2006.01) | |
| *F02C 3/04* | (2006.01) | |
| *F02C 7/10* | (2006.01) | |
| *F02C 7/232* | (2006.01) | |
| *F02C 9/26* | (2006.01) | |

(52) U.S. Cl.
CPC ............... *F02C 7/10* (2013.01); *F02C 7/232* (2013.01); *F02C 9/28* (2013.01); *F02C 9/263* (2013.01); *F05D 2260/85* (2013.01); *F05D 2270/112* (2013.01); *F05D 2270/20* (2013.01); *F05D 2270/303* (2013.01); *F05D 2270/306* (2013.01); *F05D 2270/3015* (2013.01); *F05D 2270/3032* (2013.01)

(56) References Cited

U.S. PATENT DOCUMENTS

| | | |
|---|---|---|
| 2007/0227155 A1 | 10/2007 | Nemet et al. |
| 2008/0229755 A1 | 9/2008 | Koganezawa et al. |
| 2010/0332103 A1 | 12/2010 | Dean et al. |
| 2014/0090353 A1* | 4/2014 | Simons ............... F02C 9/00 60/39.5 |
| 2014/0260314 A1* | 9/2014 | Koganezawa ........... F02C 9/40 60/787 |
| 2015/0113997 A1* | 4/2015 | Ewens ............... G05D 7/0617 60/775 |
| 2017/0122208 A1* | 5/2017 | Kessler ............... F02C 9/18 |

FOREIGN PATENT DOCUMENTS

| | | |
|---|---|---|
| JP | 4030432 B2 | 10/2007 |
| JP | 2008-51013 A | 3/2008 |
| JP | 2008-231963 A | 10/2008 |
| JP | 2011-7186 A | 1/2011 |

OTHER PUBLICATIONS

Japanese-language Office Action issued in Japanese Application No. 2017-019348 dated Mar. 31, 2020 with English translation (11 pages).
Hindi-language Office Action issued in Indian Application No. 201814003322 dated Jun. 10, 2020 with English translation (seven (7) pages).

* cited by examiner

HUMID AIR TURBINE

BACKGROUND OF THE INVENTION

1. Field of the Invention

The present invention relates to humid air turbines.

2. Description of the Related Art

A humid air turbine, one type of gas turbine, increases the moisture contained in the air to be supplied for combustion, thereby improving output power and efficiency (see JP-2004-308596-A).

SUMMARY OF THE INVENTION

In recent years, power plants utilizing renewable energy, such as wind or solar power plants, are increasingly used. Since the amount of power generated from renewable energy varies depending on the season or weather, gas turbine power plants are often used to stabilize the power of an entire power system. Due to the increase in the amount of power generated from renewable energy, the extent of its fluctuation is also increasing. Meanwhile, shortening the start-up time (fast start-up) is demanded of gas turbine power plants for the purpose of stabilizing the power of an entire power system. However, in a humid air turbine in which the heat of the turbine exhaust gas is used to generate high-temperature moisture and thereby increase the moisture content in compressed air, the start-up time is longer than in standard gas turbines if the load is increased only after moisture is generated.

Also, in a humid air turbine, the specific heat and heat transfer coefficient of combustion gas (turbine inlet gas) are larger than in standard gas turbines. Thus, if the humid air turbine is operated at a combustion temperature similar to those in standard gas turbines, the heat loads on the turbine blades increase, which may result in shortened mechanical life spans or damage. A typical method for preventing increases in the heat loads on the turbine blades is to control the turbine exhaust temperature such that it will not exceed a given value and thereby ensure that the combustion gas temperature will not exceed a limit value. The humid air turbine of JP-2004-308596-A measures the turbine exhaust temperature while moisture is supplied to compressed air, thereby controlling the fuel flow rate such that the exhaust temperature is maintained within an optimal temperature range. However, in a humid air turbine, if the moisture content in the combustion gas increases with an increase in the moisture content in the compressed air, the specific heat and heat transfer coefficient of the combustion gas could also increase, which may increase the heat loads on the turbine blades. In JP-2004-308596-A, no attention is paid to the increase in the specific heat and heat transfer coefficient of the combustion gas due to the increase in the moisture content in the combustion gas. Thus, even if the exhaust temperature is controlled such that it stays within a predetermined optimal temperature range, the combustion gas temperature may increase over the limit value due to an increase in the moisture content in the combustion gas, causing the heat loads on the turbine blades to exceed an allowable value.

The present invention has been contrived in view of the above, and an object of the invention is to provide a humid air turbine that shortens the time required for start-up and prevents excessive increases in the heat loads on the turbine blades.

To achieve the above object, a humid air turbine according to the invention includes a combustion gas moisture ratio calculating section for calculating (acquiring) the ratio of moisture contained in combustion gas (combustion gas moisture ratio); an exhaust temperature upper limit calculating section for setting an exhaust temperature upper limit based on the combustion gas moisture ratio and the pressure ratio; and an exhaust temperature difference calculating section for calculating the difference between the exhaust temperature and the exhaust temperature upper limit. The exhaust temperature difference calculating section is used as the counterpart in conventional control methods to control the fuel flow rate of a fuel supply system.

In accordance with the invention, it is possible to obtain a humid air turbine that shortens the time required for start-up and prevents excessive increases in the heat loads on the turbine blades.

DESCRIPTION OF THE PREFERRED EMBODIMENT

Embodiment (Structure)

1. Humid Air Turbine Power Plant

Figure 1:
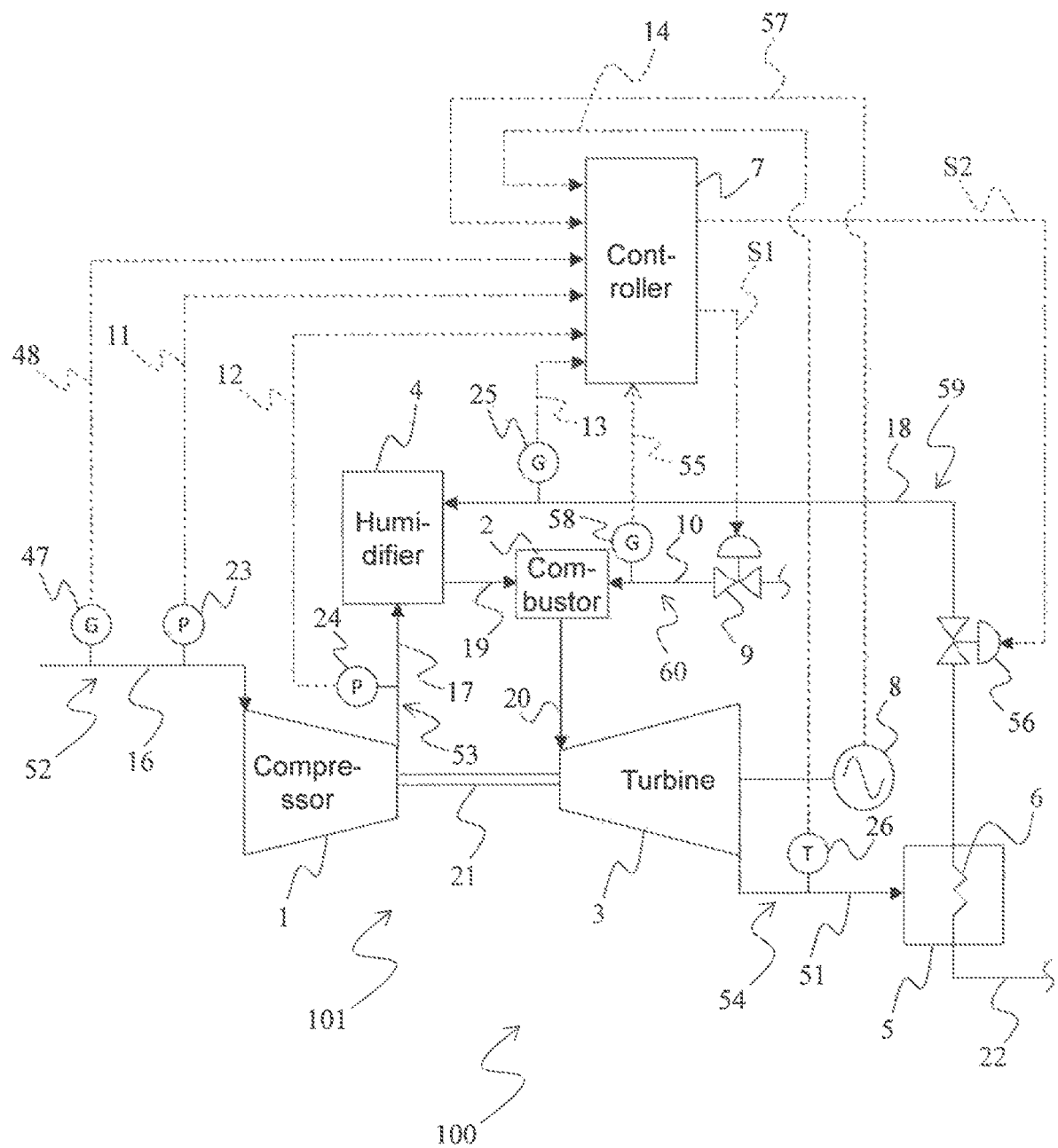
FIG. 1 illustrates an example of the structure of a humid air turbine power plant according to an embodiment of the invention.

FIG. 1 illustrates an example of the structure of a humid air turbine power plant according to an embodiment of the invention. As illustrated in FIG. 1, the humid air turbine power plant 100 of the present embodiment includes a humid air turbine 101 and a load device 8.

The humid air turbine 101 includes a compressor 1, a combustor 2, a turbine 3, a humidifier 4, an exhaust heat recovery unit 5, and a controller 7.

The compressor 1 is rotationally driven by the turbine 3 and compresses the air (intake air) 16 it draws from the atmosphere via an intake air system 52 to generate compressed air 17. The compressor 1 supplies the compressed air 17 to the humidifier 4 via a compressed air system 53. The intake air system 52 is connected to the inlet section (not illustrated) of the compressor 1. The intake air system 52 includes an intake pressure acquiring unit (pressure sensor) 23 and an intake flow rate acquiring unit (flow meter) 47.

The intake pressure acquiring unit 23 is electrically connected to the controller 7 and outputs intake-pressure-related signals (intake pressure signals) 11 to the controller 7. The intake flow rate acquiring unit 47 is electrically connected to the controller 7 and outputs intake-flow-rate-related signals (intake flow rate signals) 48 to the controller 7. The compressed air system 53 connects the outlet section (not illustrated) of the compressor 1 and the humidifier 4. The compressed air system 53 includes a discharge pressure acquiring unit (pressor sensor) 24. The discharge pressure acquiring unit 24 is electrically connected to the controller 7 and outputs discharge-pressure-related signals (discharge pressure signals) 12 to the controller 7.

The humidifier 4 adds to the compressed air 17 supplied from the compressor 1 the moisture 18 supplied from the exhaust heat recovery unit 5 to generate humid air 19, and then supplies the humid air 19 to the combustor 2. In the present embodiment, the humidifier 4 is assumed to be a moisture injector, however, may be a structure adopting a humidifying tower or the like.

The combustor 2 mixes the humid air 19 supplied from the humidifier 4 with the fuel 10 supplied from a fuel supply system 60 to combust the mixed gas. The high-temperature combustion gas 20 generated is supplied to the turbine 3. The fuel supply system 60 connects a fuel supply source (not illustrated) and the combustor 2. The fuel supply system 60 is used to supply fuel to the combustor 2. The fuel supply system 60 includes a fuel flow rate control valve 9 and a fuel flow rate acquiring unit (flow meter) 56. The fuel flow rate control valve 9 is used to control (adjust) the amount of fuel to be supplied to the combustor 2. In the present embodiment, the fuel flow rate control valve 9 is electrically connected to the controller 7 and receives a command signal S1 from the controller 7 to adjust its opening angle and control the amount of fuel supplied to the combustor 2. The fuel flow rate acquiring unit 58 is electrically connected to the controller 7 and outputs to the controller 7 signals 55 related to the amount of fuel supplied to the combustor 2 (fuel flow rate signals).

The turbine 3 is rotationally driven by the expansion of the combustion gas (turbine inlet gas) 20 supplied from the combustor 2. After driving the turbine 3, the combustion gas 20 is discharged from the outlet section (not illustrated) of the turbine 3 as turbine exhaust gas (exhaust) 51 and supplied through an exhaust system 54 to the exhaust heat recovery unit 5. The exhaust system 54 connects the outlet section of the turbine 3 and the exhaust heat recovery unit 5. The exhaust system 54 includes an exhaust temperature acquiring unit (thermometer) 26. The exhaust temperature acquiring unit 26 is used to acquire the temperature of the exhaust 51. The exhaust temperature acquiring unit 26 is electrically connected to the controller 7 and outputs exhaust-temperature-related signals (exhaust temperature signals) 14 to the controller 7.

The exhaust heat recovery unit 5 generates high-temperature moisture (water vapor in the present embodiment) 18 by recovering heat from the exhaust 51 of the turbine 3 and supplies it to the humidifier 4 via a moisture system 59. In the present embodiment, the exhaust heat recovery unit 5 includes a heat exchanger 6 and generates the high-temperature moisture 18 by heating the heat exchanger 5 using the exhaust 51 supplied from the turbine 3 and exchanging heat with the water (supplied water) 22 supplied to the heat exchanger 6. The moisture system 59 connects the exhaust heat recovery unit 5 (heat exchanger 6) and the humidifier 4. The moisture system 59 includes a moisture supply amount control valve 56 and a moisture supply amount acquiring unit (flow meter) 25. The moisture supply amount control valve 56 controls the amount of moisture (moisture supply amount) to be supplied to the humidifier 4. The moisture supply amount control valve 56 does not necessarily need to be provided on the line connecting the exhaust heat recovery unit 5 and the humidifier 4; it can instead be located on a bypass line (not illustrated) of the moisture system 59. In the present embodiment, the moisture supply amount control valve 56 is electrically connected to the controller 7 and receives a command signal S2 from the controller 7 to adjust its opening angle and control the amount of moisture to be supplied to the humidifier 4 such that the combustor 2 can provide a given performance such as stable combustion. The moisture supply amount acquiring unit 25 is electrically connected to the controller 7 and outputs to the controller 7 signals (moisture supply amount signals) 13 related to the moisture supply amount.

The load device (a generator in the present embodiment) 8 is coaxially coupled with the turbine 3 and converts the rotational power of the turbine 3 into electric power. In the present embodiment, the compressor 1, the turbine 3, and the load device 8 are mutually coupled by a shaft 21, and part of the rotational power of the turbine 3 is used to drive the compressor 1. The load device 8 is electrically connected to the controller 7 and outputs to the controller 7 signals (generated power signals) 57 related to power generated.

2. Controller

Figure 2:
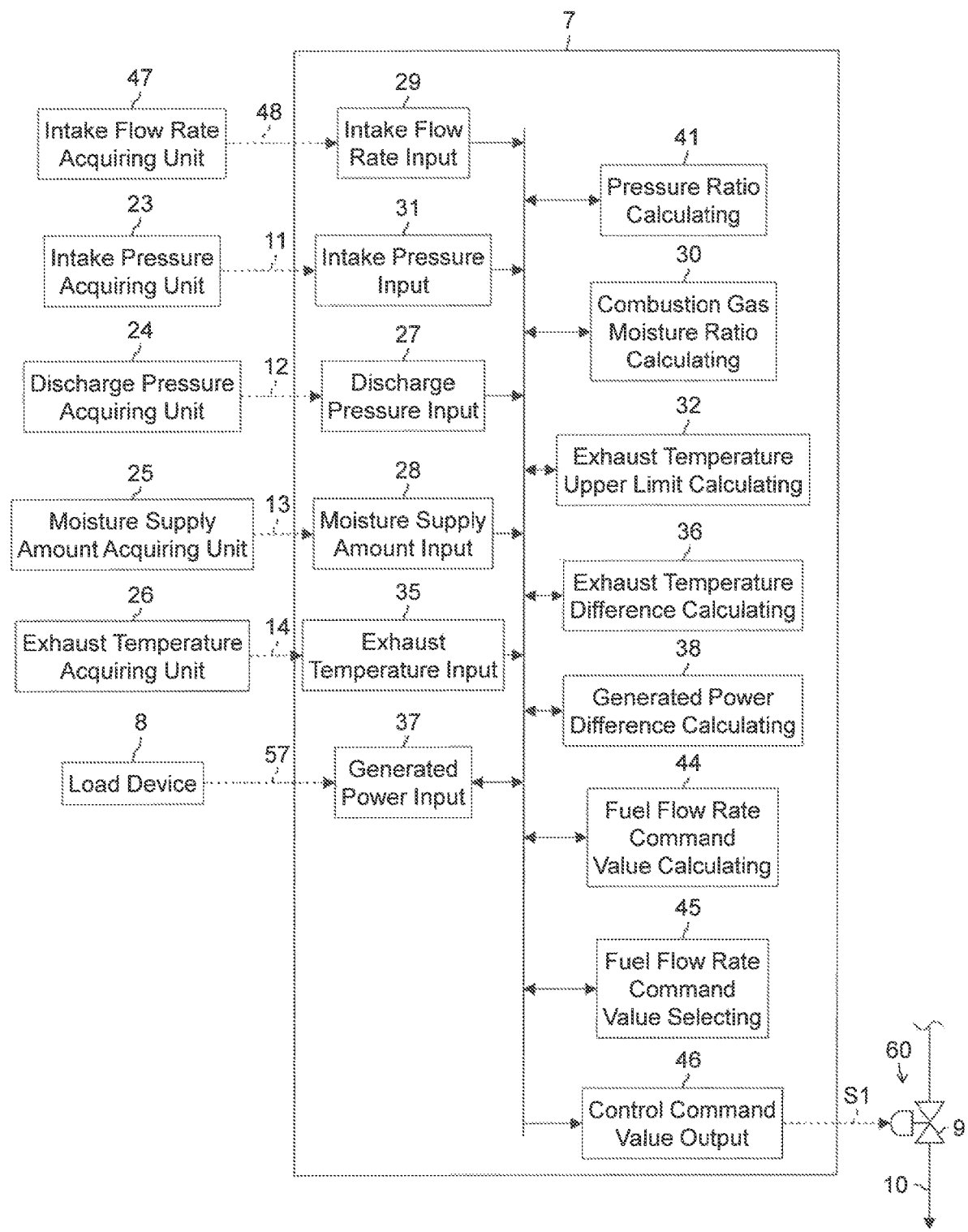
FIG. 2 is a block diagram of a controller according to the embodiment of the invention.

FIG. 2 is a block diagram of the controller of he present embodiment. The controller 7 uses a combustion gas moisture ratio calculating section 30 to calculate the ratio of moisture contained in the combustion gas based on the moisture supply amount and intake flow rate. The controller 7 also uses an exhaust temperature upper limit calculating section 32 to set an upper limit for the exhaust temperature based on the ratio of moisture contained in the combustion gas and the pressure ratio and controls the opening angle of the fuel flow rate control valve 9 such that the exhaust temperature is equal to or less than the upper limit. As illustrated in FIG. 2, other than the combustion gas moisture ratio calculating section 30 and the exhaust temperature upper limit calculating section 32, the controller 7 also includes the following components: an intake flow rate input section 29; an intake pressure input section 31; a discharge pressure input section 27; a pressure ratio calculating section 41; a moisture supply amount input section 28; an exhaust temperature input section 35; an exhaust temperature difference calculating section 36; a generated power input section 37; a generated power difference calculating section 38; a fuel flow rate command value calculating section 44; a fuel flow rate command value selecting section 45; and a control command value output section 46.

Intake Flow Rate Input Section 29

The intake flow rate input section 29 receives an intake flow rate signal 48 output from the intake flow rate acquiring unit 47.

Intake Pressure Input Section 31

The intake pressure input section 31 receives an intake pressure signal 11 output from the intake pressure acquiring unit 23.

Discharge Pressure Input Section 27

The discharge pressure input section 27 receives a discharge pressure signal 12 output from the discharge pressure acquiring unit 24.

Pressure Ratio Calculating Section 41

The pressure ratio calculating section 41 receives an intake pressure and a discharge pressure from the intake pressure acquiring unit 23 and the discharge pressure acquiring unit 24, respectively, and calculates (acquires) the pressure ratio of the compressor 1 by divining dividing the discharge pressure by the intake pressure.

Moisture Supply Amount Input Section 28

The moisture supply amount input section 28 receives a moisture supply amount signal 13 output from the moisture supply amount acquiring unit 25.

Combustion Gas Moisture Ratio Calculating Section 30

The combustion gas moisture ratio calculating section 30 receives an moisture supply amount and an intake flow rate from the moisture supply amount input section 28 and the intake flow rate input section 29, respectively, and acquires, based on the moisture supply amount and intake flow rate received, the combustion gas moisture ratio, which is the ratio of moisture contained in the combustion gas.

In the present embodiment, the combustion gas moisture ratio calculating section 30 calculates the combustion gas moisture ratio based on the moisture supply amount and intake flow rate using the following formula (1):

$$rw = Gw/(Gin+Gw) \quad \text{Formula (1)}$$

where $rw$ is the combustion gas moisture ratio, $Gin$ is the intake flow rate, and $GW$ is the moisture supply amount.

Exhaust Temperature Upper Limit Calculating Section 32

The exhaust temperature upper limit calculating section 32 calculates (sets) an upper limit for the exhaust temperature based on the functional relation of the exhaust temperature upper limit to the pressure ratio of the compressor that can be obtained in advance from the limiting value for the combustion gas temperature that changes according to the combustion gas moisture ratio and temperature constraints of the exhaust gas duct. The exhaust temperature upper limit can be obtained from the following formulae (2) to (4).

$$Tx1 = Txsup(rw) \quad \text{Formula (2)}$$

where $Tx1$ is an upper limit 1 for the exhaust temperature and $Txsup$ is a function of the exhaust temperature upper limit with the variable being the combustion gas moisture ratio. $Txsup$ is obtained in advance from temperature constraints of the exhaust system.

$$Tx2 = F(\pi c, rw) \quad \text{Formula (3)}$$

where $Tx2$ is an upper limit 2 for exhaust temperature, $\pi c$ is he pressure ratio, $F(\pi c, rw)$ is a function of the exhaust temperature upper limit with the variables being the pressure ratio and the combustion gas moisture ratio. The functional form is predetermined from the limiting value for the combustion gas temperature.

$$Tx = \min(Tx1, Tx2) \quad \text{Formula (4)}$$

where $Tx$ is the upper limit for the exhaust temperature, and $\min(Tx1, Tx2)$ is the minimum value of $Tx1$ and $Tx2$.

Figure 3:
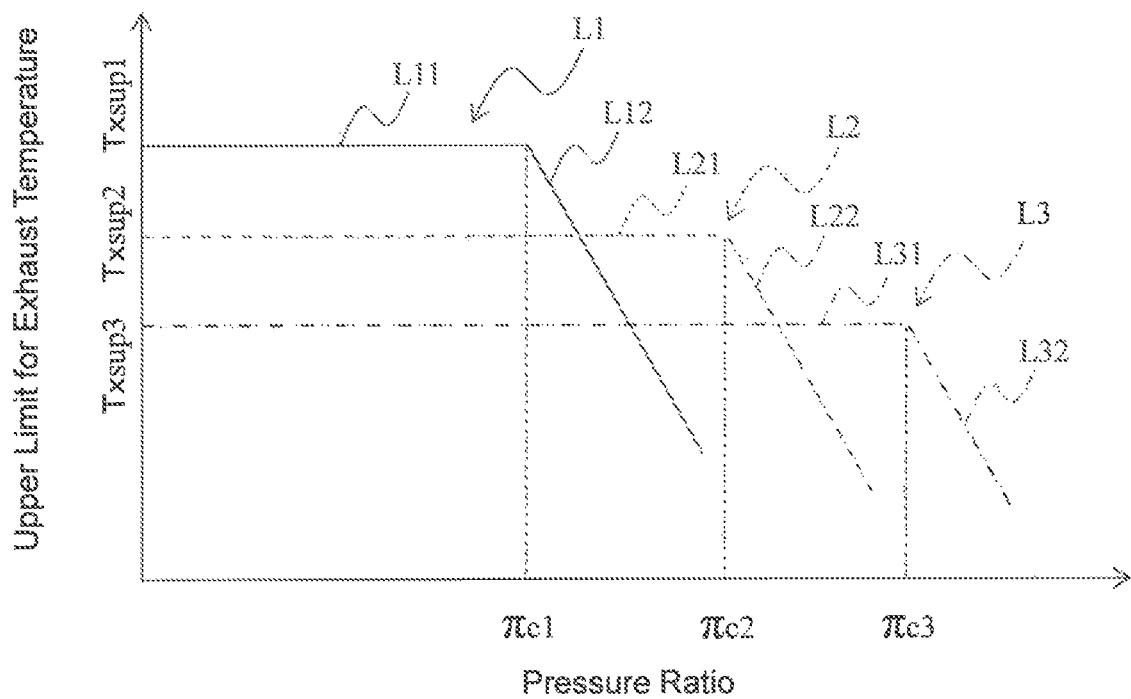
FIG. 3 is a graph illustrating exhaust temperature control lines.

Next described are exhaust temperature control lines. FIG. 3 is a graph illustrating the exhaust temperature control lines in which the horizontal axis represents the pressure ratio and the vertical axis represents the upper limits for the exhaust temperature. The exhaust temperature control lines represent the transition of the exhaust temperature upper limits based on the pressure ratio. In FIG. 3, the solid line is an exhaust temperature control line L1 when the combustion gas moisture ratio is at a first value (0, that, when no moisture is supplied to the compressed air). The one-dot chain line represents an exhaust temperature control line L2 when the combustion gas moisture ratio is at a second value while the two-dot chain line represents an exhaust temperature control line L3 when the combustion gas moisture ratio is at a predetermined third value. In FIG. 3, the combustion gas moisture ratio increases from the first value through the second value to the third value. In the humid air turbine, as the combustion gas moisture ratio increases with increases in the amount of moisture supplied to the compressed air, the specific heat and heat transfer coefficient of the combustion gas could also increase. Thus, in the present embodiment, the exhaust temperature upper limits are set by changing the exhaust temperature control lines according to increases in the combustion gas moisture ratio.

In the present embodiment, the exhaust temperature control lines are defined continuously in relation to the pressure ratio and have horizontal portions where the exhaust temperature upper limits are fixed regardless of the pressure ratio and descending portions where the exhaust temperature upper limits decrease with increases in the pressure ratio. In the example of FIG. 3, the exhaust temperature control line L1 has a horizontal portion L11 and a descending portion L12, the exhaust temperature control line L2 has a horizontal portion L21 and a descending portion L22, and the exhaust temperature control line L3 has a horizontal portion L31 and a descending portion L32. The horizontal portions of the exhaust temperature control lines are due to the constraints of the turbine exhaust gas temperature (exhaust temperature) and prevent the exhaust temperature from increasing excessively (for example, from exceeding the allowable temperature of the member that constitutes the exhaust system connected to the outlet section of the turbine). In the present embodiment, the exhaust temperature upper limits at the horizontal portions of the exhaust temperature control lines are set larger enough than the allowable temperature of the member constituting the exhaust system. The descending portions of the exhaust temperature control lines are such that the exhaust temperature upper limits decrease with increases in the discharge pressure and prevent the combustion gas temperature from increasing too much (for example, from exceeding the heat-proof temperature of the turbine blades) to protect the turbine.

The exhaust temperature control lines of the present embodiment are set such that the pressure ratio shifts from the horizontal portions to the descending portions at certain pressure switch ratios. In the example of FIG. 3, the pressure switch ratio of the exhaust temperature control line L1 is $\pi c1$, the pressure switch ratio of the exhaust temperature control line L2 is $\pi c2$, the pressure switch ratio of the exhaust temperature control line L3 is $\pi c3$, and the exhaust temperature upper limits at the horizontal portions of the exhaust temperature control lines L1, L2, and L3 are $Txsup1$, $Txsup2$, and $Txsup3$, respectively.

Exhaust Temperature Input Section 35

The exhaust temperature input section 35 receives an exhaust temperature signal 14 output from the exhaust temperature acquiring unit 26.

Exhaust Temperature Difference Calculating Section 36

The exhaust temperature difference calculating section 36 receives the exhaust temperature input to the exhaust temperature input section 35 and the exhaust temperature upper limit set by the exhaust temperature upper limit calculating section 32 to calculate the difference (first difference) between the exhaust temperature and the exhaust temperature upper limit.

Generated Power Input Section 37

The generated power input section 37 receives a generated power signal 57 output from the load device 8.

Generated Power Difference Calculating Section 38

The generated power difference calculating section 38 receives the generated power input to the generated power input section 37 and the power demanded by the load dispatch center or the like (demanded power) to calculate the difference (second difference) between the generated power and the demanded power.

Fuel Flow Rate Command Value Calculating Section 44

The fuel flow rate command value calculating section 44 receives the first difference calculated by the exhaust temperature difference calculating section 36 to calculate a first fuel flow rate command value, receives the second difference calculated by the generated power difference calculating section 38 to calculate a second fuel flow rate command value, and calculates a third fuel flow rate command value and the like based on the rotational speed or other operational status.

Fuel Flow Rate Command Value Selecting Section 45

The fuel flow rate command value selecting section 45 selects the minimum value from among the multiple fuel flow rate command values calculated by the fuel flow rate command value calculating section 44 as a fuel flow rate control command value that controls the fuel flow rate of the fuel supply system.

Control Command Value Output Section 46

The control command value output section 46 calculates a control command value for the fuel flow rate control valve 9 based on the fuel flow rate control command value selected by the fuel flow rate command value selecting section 45 and outputs a command signal S1 to the fuel flow rate control valve 9.

(Operation)

Control Procedures for the Fuel Flow Rate Control Valve 9

Figure 4:
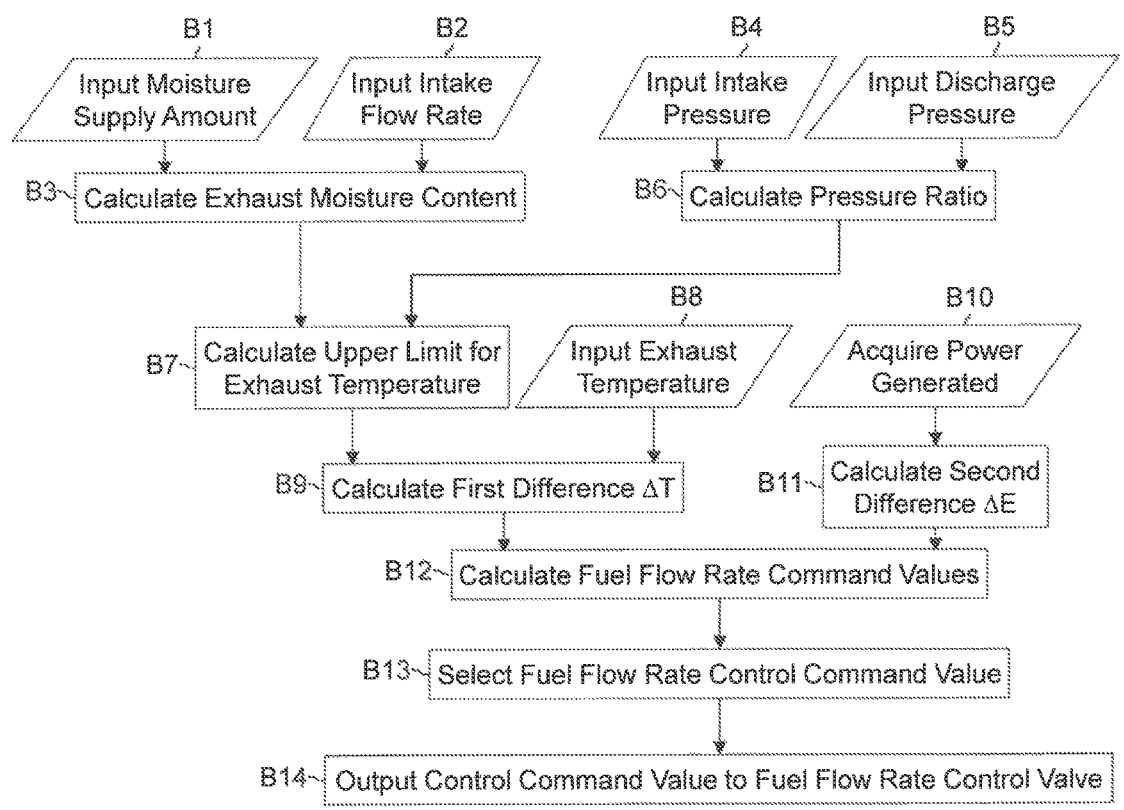
FIG. 4 is a flowchart illustrating the procedures for controlling the fuel flow rate control valve of the humid air turbine according to the embodiment of the invention.

We now describe the procedures for controlling the fuel flow rate control valve 9 of the humid air turbine of the present embodiment. FIG. 4 is a flowchart illustrating the procedures for controlling the fuel flow rate control valve 9 of the humid air turbine of the present embodiment.

The moisture supply amount input section 28 receives the moisture supply amount acquired by the moisture supply amount acquiring unit 25 (Step B1).

The intake flow rate input section 29 receives the intake flow rate acquired by the intake flow rate acquiring unit 47 (Step B2).

The combustion gas moisture ratio calculating section 30 calculates the combustion gas moisture ratio based on the moisture supply amount input to the moisture supply amount input section 28 and the intake flow rate input to the intake flow rate input section 29 (Step B3).

The intake pressure input section 31 receives the intake pressure acquired by the intake pressure acquiring unit 23 (Step B4).

The discharge pressure input section 27 receives the discharge pressure acquired by the discharge pressure acquiring unit 24 (Step B5).

The pressure ratio calculating section 41 calculates the pressure ratio based on the intake pressure input to the intake pressure input section 31 and the discharge pressure input to the discharge pressure input section 27 (Step B6).

The exhaust temperature upper limit calculating section 32 calculates the exhaust temperature upper limit based on the combustion gas moisture ratio calculated by the combustion gas moisture ratio calculating section 30 and the pressure ratio calculated by the pressure ratio calculating section 41 (Step B7).

The exhaust temperature input section 35 receives the exhaust temperature acquired by the exhaust temperature acquiring unit 26 (Step B8).

The exhaust temperature difference calculating section 36 calculates the first difference $\Delta T$ based on the exhaust temperature input to the exhaust temperature input section 35 and the exhaust temperature upper limit calculated by the exhaust temperature upper limit calculating section 32 (Step B9).

The generated power input section 37 receives the generated power from the load device 8 (Step B10).

The generated power difference calculating section 38 calculates the second difference $\Delta T$ based on the generated power acquired by the generated power input section 37 and the demanded power (Step B11).

The fuel flow rate command value calculating section 44 then calculates the first fuel flow rate command value by receiving the first difference calculated by the exhaust temperature difference calculating section 36, calculates the second fuel flow rate command value by receiving the second difference calculated by the generated power difference calculating section 38, and calculates the third fuel flow rate command value and the like based on the rotational speed or other operational status (Step B12).

The fuel flow rate command value selecting section 45 selects the minimum value from among the multiple fuel flow rate command values calculated by the fuel flow rate command value calculating section 44 as a fuel flow rate control command value that controls the fuel flow rate of the fuel supply system (Step B13).

The control command value output section 46 then outputs the command signal S1 based on the command value selected by the fuel flow rate command value selecting section 45 (Step B14).

Operation of the Humid Air Turbine Power Plant 100

Figure 5:
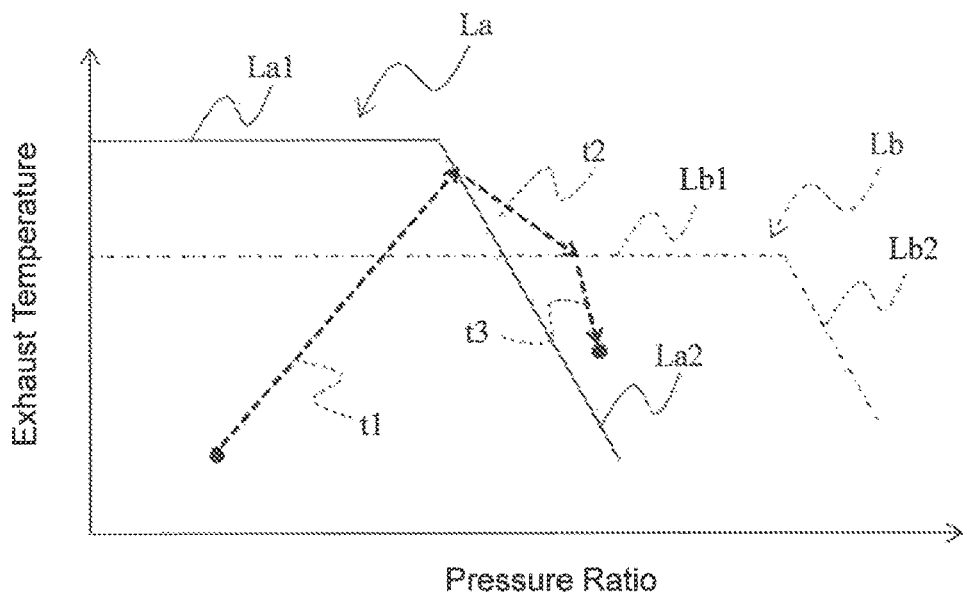
FIG. 5 is a graph illustrating the operation of the humid air turbine power plant according to an embodiment of the invention.
Figure 6:
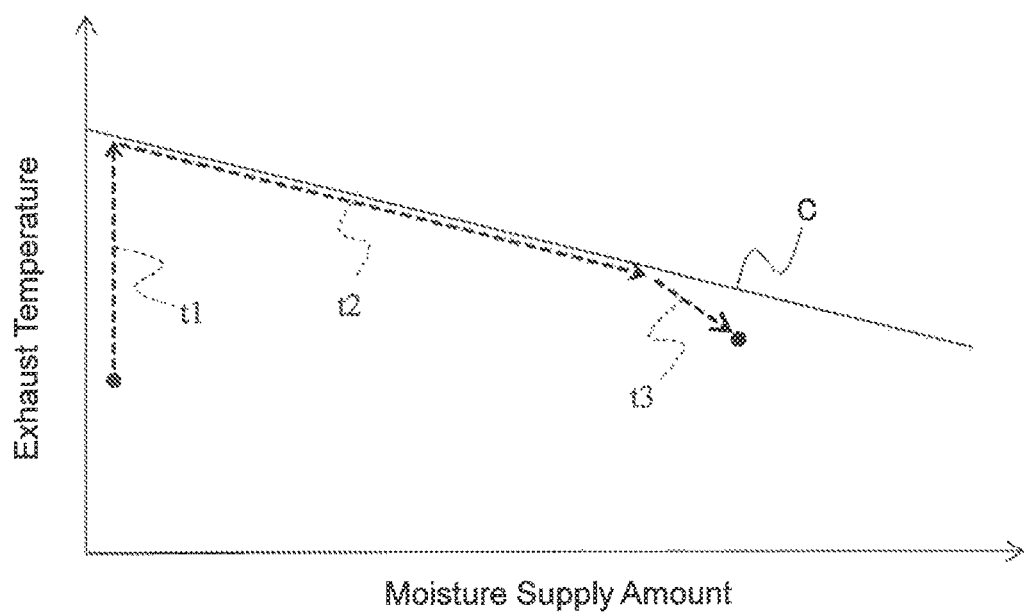
FIG. 6 is a graph illustrating the operation of the humid air turbine power plant according to the embodiment of the invention.
Figure 7:
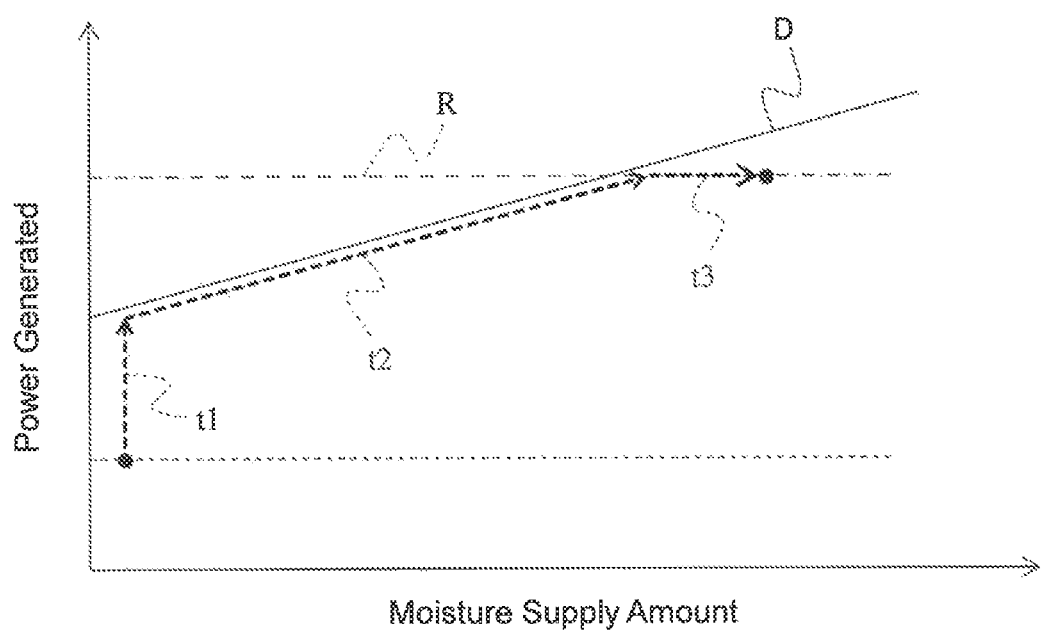
FIG. 7 is a graph illustrating the operation of the humid air turbine power plant according to the embodiment of the invention.

We now describe as an example the start-up operation of the humid air turbine power plant 100 of the present embodiment. FIGS. 5 to 7 are graphs illustrating the operation of the humid air turbine power plant 100 of the present embodiment. In FIG. 5, the horizontal axis represents the pressure ratio, the vertical axis represents the exhaust temperature upper limit, the solid line represents the exhaust temperature control line La obtained when the combustion gas moisture ratio is at a first value (0), and the one-dot chain line represents the exhaust temperature control line Lb obtained when the combustion gas moisture ratio is at a second value. In FIG. 6, the horizontal axis represents the moisture supply amount, the vertical axis represents the exhaust temperature, and the solid line represents the exhaust temperature upper limit transition line C that denotes the transition of he exhaust temperature upper limit due to increases in the moisture supply amount. In FIG. 7, the horizontal axis represents the moisture supply amount, the vertical axis represents the power generated, the solid line represents the upper power limit transition line D that denotes the transition of the upper limit for the generated power due to increases in the moisture supply amount, and the one-dot chain line represents the target start-up power line R that denotes the target power (rated power) after start-up. The upper power limit transition line D indicates the output power when the exhaust temperature reaches the exhaust temperature upper limit in each combustion gas moisture ratio. We assume here that the demanded power is increased according to a load increase rate preset at the time of start-up.

Since the exhaust temperature is low at the time of the start-up of the humid air turbine power plant 100, moisture will not be supplied (the moisture supply amount is 0) for a given amount of time (during a first time period t1) after the start-up of the humid air turbine power plant 100. The exhaust temperature increases with load increases. FIGS. 5 and 6 illustrate the case where the exhaust temperature reaches the exhaust temperature upper limit of the exhaust temperature control line La before moisture starts to be supplied. During the first time period t1 the fuel flow rate command value selecting section 45 selects the minimum value as the fuel flow rate control command value from among the first fuel flow rate command value calculated from the first difference ΔT, the second fuel flow rate command value calculated from the second difference ΔE, and the third fuel flow rate command value calculated by the fuel flow rate command value calculating section 44 based on the rotational speed or other operational status. Because the first difference ΔT calculated by the exhaust temperature difference calculating section 36 and the second difference ΔE calculated by the generated power difference calculating section 38 are both positive until the exhaust temperature reaches the exhaust temperature upper limit of the exhaust temperature control line La, which fuel flow rate command value is selected, the first value, the second value, or the third value, depends on the situation. However, because the first time period t1 is the load increasing phase at the time of start-up, all of the first to third fuel flow rate command values work to increase the fuel flow rate. Thus, since the control command value output section 46 calculates the control command value that increases the opening angle of the fuel flow rate control valve 9 based on the selected fuel flow rate control command value and outputs the command signal S1 to the fuel flow rate control valve 9, the fuel flow rate of the power plant increases, which results in increased load. After the exhaust temperature reaches the exhaust temperature upper limit of the exhaust temperature control line La, the first difference ΔT becomes 0, and the fuel flow rate command value selecting section 45 selects the first fuel flow rate command value, which was calculated so as not to increase the exhaust temperature, thereby keeping the exhaust temperature constant. At this time, the fuel flow rate will not increase; thus, the load stays constant until moisture starts to be supplied.

After moisture starts to be supplied, the load increases with increases in the moisture supply amount, and the exhaust temperature decreases. If the second difference ΔE (the difference between the generated power and the demanded power) is large at this time, the exhaust temperature decrease due to the increase in the moisture supply amount may be offset by the exhaust temperature increase due to the increases in load and fuel flow rate. In this case, the first difference ΔT (the difference between the exhaust temperature and the exhaust temperature upper limit) is calculated from the exhaust temperature upper limit that has decreased since the exhaust temperature upper limit decreases with increases in the combustion gas moisture ratio. The fuel flow rate command value selecting section 45 then selects the first fuel flow rate command value calculated from he first difference, the fuel flow rate is controlled such that the exhaust temperature becomes equal to the upper limit, and the exhaust temperature moves along the upper limit transition line C (FIG. 6) (second time period t2). At this time, the output power moves along the upper power limit transition line D (FIG. 7) and reaches the target power such as the rated power when the moisture supply amount increases.

Once the output power reaches the target power, the second difference ΔE (the difference between the generated power and the demanded power) becomes 0. Thus, the fuel flow rate command value selecting section 45 selects the second fuel flow rate command value calculated from he second difference, and the fuel flow rate is controlled such that the generated power becomes equal to the demanded power (target start-up power). When the moisture supply amount continues to increase after the target power is reached, the generated power shifts onto the target start-up power line R. The exhaust temperature decreases with the generated power remaining fixed and becomes lower than the exhaust temperature control line Lb (FIGS. 5 to 7: third time period t3).

(Advantages)

(1) In the present embodiment, a fuel flow rate command value is selected such that it matches the demanded power that changes according to a preset load increase rate independently of the moisture supply amount, thereby controlling the fuel flow rate control valve 9. Therefore, it is not necessary to maintain a given partial load and increase the load after moisture starts to be supplied, and it is thus possible to exclude the wait time and shorten the time required for start-up. Also, since the load is increased earlier without requiring wait time at a given partial load, the exhaust temperature becomes high, moisture starts to be supplied earlier, and it is possible to shorten the time required to reach the target start-up power (rated power or the like).

Moreover, unless the dependency of the moisture supply amount on the exhaust temperature upper limit is considered, it is necessary to set a lower exhaust temperature upper limit in preparation for cases where the moisture amount is large even when the turbine is operated with a small amount of moisture. In that case, the exhaust temperature may be maintained at a low value by the load increase at the time of start-up, and the time required to wait for he start of supply may be extended. This may be avoided by taking into account the dependency of the moisture supply amount on the exhaust temperature upper limit.

(2) In the present embodiment, since the exhaust temperature upper limit is reduced based on the combustion gas moisture ratio after the start of moisture supply, a fuel flow rate command value is selected such that it does not exceed the exhaust temperature upper limit that has been decreased, thereby controlling the fuel flow rate control valve 9. Thus, even if moisture is supplied to the compressed air and the moisture content in the combustion gas increases, it is possible to avoid the exhaust temperature exceeding the upper limit and also prevent the heat loads on the turbine blades from exceeding an allowable value.

With the above, in the present embodiment, it is possible to shorten the time required for start-up and prevent excessive increases in the heat loads on the turbine blades.

<Others>

The present invention is not limited to the embodiment described above but allows various modifications. The above embodiment is intended to be illustrative only, and the invention does not necessarily need to have all the components of the embodiment. For example, some components of the embodiment can be removed or replaced.

In the above embodiment, we have described the structure in which the humid air turbine 101 includes the humidifier 4. However, the essential object of the invention is to provide a humid air turbine which shortens the time required for start-up and prevents excessive increases in the heat loads on the turbine blades, and the invention is not limited to the above structure as long as that essential object can be achieved. For example, in place of the humidifier 4, it is also possible to provide on the inlet side of the compressor 1 a water atomization cooling (WAC) system or intake air cooler, which supply moisture to the intake air 16 of the compressor 1. It is also possible to supply part or all of the moisture 18 generated at the exhaust heat recovery unit 5 to the combustor 2 to generate the humid air 19 and then mix it with the fuel 10 to combust the mixed gas, thereby generating the combustion gas 20. When all of the moisture 18 is supplied to the combustor 2, the functions of the humidifier 4 can be integrated into the combustor 2.

In the above embodiment, we have also described the structure in which the flow meter 25 provided in the moisture system 59 acquires the moisture supply amount. However, the invention is not necessarily limited to that structure as long as the essential object of the invention can be achieved. For example, if the moisture generated by the exhaust heat recovery unit 5 is to be supplied to the humidifier 4 via a moisture injector, the moisture supply amount can be acquired based on the opening angle of a valve of the moisture injector. Also, if a humidifying tower is to be used as the humidifier 4, it is possible to acquire the moisture supply amount based on the difference between the amount of water supplied to the humidifying tower and the amount of water extracted from the tower or acquire the moisture supply amount based on a water level change in the humidifier tower lower tank and the amount of water supplied or extracted. Further, it is also possible to use a measurement instrument to directly measure the moisture content in the compressed air supplied to the combustor.

In the above embodiment, we have also described the structure in which the combustion gas moisture ratio calculating section 30 acquires the combustion gas moisture ratio based on the moisture supply amount and the intake flow rate. However, the invention is not necessarily limited to that structure as long as the essential object of the invention can be achieved. For example, it is also possible for the combustion gas moisture ratio calculating section 30 to further calculate from the fuel flow rate the combustion-time generated moisture amount generated in the combustor 2 at the time of combustion of the fuel and calculate the combustion gas moisture ratio by considering the combustion-time generated moisture amount acquired. This improves the accuracy of the combustion gas moisture ratio compared with the case where the combustion gas moisture ratio is obtained based only on the moisture supply amount and the intake flow rate and more accurately prevents excessive increases in the heat loads on the turbine blades.

In the above embodiment, we have also described the structure in which the exhaust temperature upper limit calculating section 32 receives the combustion gas moisture ratio calculated by the combustion gas moisture ratio calculating section 30 and calculates an exhaust temperature upper limit based on the combustion gas moisture ratio it received and a given function. However, the invention is not necessarily limited to that structure as long as the essential object of the invention can be achieved. For example, it is also possible for the exhaust temperature upper limit calculating section 32 to preset the exhaust temperature control lines for given ranges of the combustion gas moisture ratio and select the exhaust temperature control line that corresponds to the combustion gas moisture ratio acquired by the combustion gas moisture ratio calculating section 30.

In the above embodiment, we have also described the structure in which the exhaust temperature upper limit calculating section 32 calculates an exhaust temperature upper limit using a function of the combustion gas moisture ratio. However, the invention is not necessarily limited to that structure as long as the essential object of the invention can be achieved. For example, it is also possible to set the exhaust temperature upper limit calculating section 32 such that the exhaust temperature upper limit is not based on the combustion gas moisture ratio and correct based on the combustion gas moisture ratio the first fuel flow rate command value calculated by the fuel flow rate command value calculating section 44 from the first difference $\Delta T$ (the difference between the exhaust temperature and the exhaust temperature upper limit) to calculate the first fuel flow rate command value.

In the above embodiment, we have also described the structure in which the pressure ratio calculating section 41 calculates the pressure ratio based on the discharge pressure input to the discharge pressure input section 27 and the intake pressure input to the intake pressure input section 31. However, the invention is not necessarily limited to that structure as long as the essential object of the invention can be achieved. For example, it is also possible for the pressure ratio calculating section 41 to receive the rotational speed of the compressor and the intake flow rate acquired by the intake flow rate acquiring unit 47 in place of the discharge pressure and calculate the discharge pressure based on the rotational speed and intake flow rate it received to calculate the pressure ratio. It is further possible to use the discharge pressure in place of the pressure ratio. In that case, the exhaust temperature upper limit is defined in relation to the discharge pressure, and the use of the intake pressure input section 31 and the pressure ratio calculating section 41 is not necessary.

In the above embodiment, we have also stated that the first, second, or third fuel flow rate command value is selected by the fuel flow rate command value selecting section 45. However, it is instead possible to divide the third fuel flow rate command value, which is calculated from the rotational speed or other operational status, into several values and select, from among those values and the first and second fuel flow rate command values, the fuel flow rate control command value that controls the fuel flow rate of the fuel supply system.

In the above embodiment, we have also described the structure in which a command value is calculated based on the difference between the generated power and the demanded power to control the fuel flow rate control valve 9. However, the invention is not necessarily limited to that structure as long as the essential object of the invention can be achieved. For example, it is also possible to acquire the torque in place of the power generated and calculate a command value based on the difference between the torque and the demanded torque to control he fuel flow rate control valve 9.

In the above embodiment, we have also described a case where the invention is applied to a one-shaft gas turbine in which the compressor 1, the turbine 3, and the load device 8 are mutually coupled by the shaft 21. However, the invention is not limited to such a one-shaft gas turbine, but can also be applied to a two-shaft gas turbine The invention can further be applied to the structure in which the steam generated by the exhaust heat recovery boiler of a combined-cycle power generating system is supplied to a gas turbine.

DESCRIPTION OF THE REFERENCE CHARACTERS

1: Compressor
2: Combustor
3: Turbine
5: Exhaust heat recovery unit
9: Fuel flow rate control valve
10: Fuel
15: Air (intake air)

17: Compressed air
18: Moisture
19: Humid air
20: Combustion gas (turbine inlet gas)
26: Thermometer (exhaust temperature acquiring unit)
30: Combustion gas moisture ratio calculating section
32: Exhaust temperature upper limit calculating section
36: Exhaust temperature difference calculating section
38: Generated power difference calculating section
44: Fuel flow rate command value calculating section
45: Fuel flow rate command value selecting section (selecting section)
46: Control command value output section (output section)
60: Fuel supply system
101: Humid air turbine

What is claimed is:

1. A humid air turbine comprising: a compressor for compressing air to generate compressed air; a moisture system for supplying moisture to intake air of the compressor or the compressed air generated by the compressor; a combustor for mixing humid air generated by supplying the moisture to the intake air, or to the compressed air with a fuel, and combusting the mixture to generate combustion gas; a fuel supply system, having a fuel flow rate control valve, for supplying the fuel to the combustor; a turbine rotationally driven by the combustion gas supplied from the combustor; a sensor configured to acquire an exhaust temperature that is a temperature of exhaust discharged while the turbine is driven; and a controller configured to perform steps of: calculating a pressure ratio of the compressor based on a discharge pressure and an intake pressure; acquiring a combustion gas moisture ratio that is a ratio of moisture contained in the combustion gas based on a moisture supply amount and an intake flow rate; calculating an upper limit for the exhaust temperature based on the combustion gas moisture ratio and the pressure ratio using a functional relation of an exhaust temperature upper limit to the pressure ratio of the compressor that is obtained in advance from a limiting value for a combustion gas temperature that changes according to the combustion gas moisture ratio and temperature constraints of an exhaust gas duct; and outputting a command signal to the fuel flow rate control valve using a fuel flow rate command value calculated based on a difference between the exhaust temperature upper limit and the exhaust temperature, wherein the upper limit for the exhaust temperature is variable value that varies with the combustion gas moisture ratio and the pressure ratio.

2. The humid air turbine of claim 1, wherein part or all of the moisture supplied to the intake air or the compressed air is supplied to the combustor.

3. The humid air turbine of claim 1, further comprising: an exhaust heat recovery unit for recovering heat of the exhaust to generate moisture and supplying the moisture to the moisture system.

4. The humid air turbine of claim 3, wherein the exhaust temperature acquiring unit is a thermometer provided in an exhaust system connecting the turbine and the exhaust heat recovery unit.

5. The humid air turbine of claim 1, wherein the controller calculates the combustion gas moisture ratio based on an amount of moisture supplied by the moisture system.

6. The humid air turbine of claim 5, wherein the controller calculates, based on a fuel flow rate supplied to the combustor, a combustion-time generated moisture amount generated by the combustion of the fuel in the combustor and further calculates the combustion gas moisture ratio by summing up the calculated combustion-time generated moisture amount to the amount of moisture supplied by the moisture system.

7. The humid air turbine according to claim 1, wherein the controller sets the upper limit for the exhaust temperature lower according to the combustion gas moisture ratio increases when calculating the upper limit for the exhaust temperature based on the combustion gas moisture ratio and the pressure ratio.

8. A method for controlling a humid air turbine, comprising: compressing, using a compressor, air to generate compressed air; supplying, using a moisture system, moisture to intake air of the compressor or the compressed air generated by the compressor; mixing, using a combustor, humid air generated by supplying the moisture to the intake air or the compressed air with a fuel and combusting the mixture to generate combustion gas; supplying, using a fuel supply system having a fuel flow rate control valve, the fuel to the combustor; rotationally driving a turbine by the combustion gas supplied from the combustor; acquiring, using a sensor, an exhaust temperature that is a temperature of exhaust discharged while the turbine is driven; and using a controller: calculating a pressure ratio of the compressor based on a discharge pressure and an intake pressure; acquiring a combustion gas moisture ratio that is a ratio of moisture contained in the combustion gas based on a moisture supply amount and an intake flow rate; calculating an upper limit for the exhaust temperature based on the combustion gas moisture ratio and the pressure ratio using a functional relation of an exhaust temperature upper limit to the pressure ratio of the compressor that is obtained in advance from a limiting value for a combustion gas temperature that changes according to the combustion gas moisture ratio and temperature constraints of an exhaust gas duct; and outputting a command signal to the fuel flow rate control valve using a fuel flow rate command value calculated based on a difference between the exhaust temperature upper limit and the exhaust temperature, wherein the upper limit for the exhaust temperature is variable value that varies with the combustion gas moisture ratio and the pressure ratio.

9. The method of claim 8, wherein the moisture is supplied to at least one of the intake air of the compressor or the compressed air generated by the compressor.

10. The method of claim 8, wherein part of the moisture is supplied to at least one of the intake air of the compressor or the compressed air generated by the compressor, and rest of the moisture is supplied to the combustor.

11. The method of claim 8, wherein the moisture is supplied to the combustor.

12. The method according to claim 8, wherein the controller sets the upper limit for the exhaust temperature lower according to the combustion gas moisture ratio increases when calculating the upper limit for the exhaust temperature based on the combustion gas moisture ratio and the pressure ratio.

* * * * *